(12) United States Patent
Gilbert (10) Patent No.: US 11,078,977 B1
(45) Date of Patent: Aug. 3, 2021

(54) ONE-WAY AND TWO-WAY BRAKE AUTO-ADJUSTERS

(71) Applicant: Parker-Hannifin Corporation, Cleveland, OH (US)

(72) Inventor: Kenneth T. Gilbert, Bristol, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 180 days.

(21) Appl. No.: 16/132,570

(22) Filed: Sep. 17, 2018

Related U.S. Application Data (60) Provisional application No. 62/562,605, filed on Sep. 25, 2017.

(51) Int. Cl.
| | |
|---|---|
| *F16D 65/54* | (2006.01) |
| *F16D 65/64* | (2006.01) |
| *B60T 1/06* | (2006.01) |
| *F16D 65/09* | (2006.01) |
| *F16D 125/64* | (2012.01) |
| *F16D 65/38* | (2006.01) |

(52) U.S. Cl.
CPC ............ *F16D 65/546* (2013.01); *B60T 1/067* (2013.01); *F16D 65/091* (2013.01); *F16D 65/64* (2013.01); *F16D 2065/383* (2013.01); *F16D 2125/64* (2013.01)

(58) Field of Classification Search
CPC .... F16D 65/562; F16D 65/565; F16D 65/561; F16D 65/563; F16D 65/564; F16D 65/566; F16D 51/30; F16D 51/22
USPC ................................ 188/79.64, 79.56, 79.53
See application file for complete search history.

(56) References Cited

U.S. PATENT DOCUMENTS

| | | | | |
|---|---|---|---|---|
| 1,710,146 A | * | 4/1929 | Chanter | F16D 65/08 188/250 F |
| 1,759,935 A | * | 5/1930 | Chanter | F16D 65/08 188/250 F |

(Continued)

FOREIGN PATENT DOCUMENTS

| | | | | |
|---|---|---|---|---|
| EP | 0652387 A1 | * | 5/1995 | F16D 51/50 |

OTHER PUBLICATIONS

Machine translation of EP 652387, retrieved Jul. 13, 2020 (Year: 2020).*

*Primary Examiner* — Bradley T King
(74) *Attorney, Agent, or Firm* — Renner, Otto, Boisselle & Sklar, LLP (57) ABSTRACT

A brake assembly has an auto-adjustment mechanism including an adjusting link that is rotatable to adjust an unloaded state position of a brake shoe, and an adjusting lever that operates to rotate the adjusting link during a release of the braking assembly to adjust the unloaded state position of the brake shoe. The auto-adjustment mechanism includes a pivot point mounted on a brake back plate about which the adjusting lever rotates, and an adjusting spring attached to the adjusting lever. The adjusting lever rotates in a first direction against the spring force when the brake assembly is actuated, and the adjusting spring by operation of the spring force rotates the adjusting lever in a second direction when the brake assembly is released. During the brake release, as the adjusting lever rotates back the adjusting lever catches the adjusting link in a ratchet fashion to rotate the adjusting link to adjust the unloaded state position of the brake shoes.

9 Claims, 7 Drawing Sheets

(56) References Cited

U.S. PATENT DOCUMENTS

| | | | | |
|---|---|---|---|---|
| 1,873,025 A * | 8/1932 | Perrot | ............... | F16D 65/08 188/250 F |
| 1,894,036 A * | 1/1933 | Gunn | ............... | F16D 51/50 188/333 |
| 1,924,113 A * | 8/1933 | Evans | ............... | F16D 65/08 188/250 F |
| 1,924,590 A * | 8/1933 | Babei | ............... | F16D 65/08 188/250 F |
| 1,959,878 A * | 5/1934 | Schroeder | ............... | F16D 51/50 188/21 |
| 1,991,159 A * | 2/1935 | Kline | ............... | F16D 65/52 188/79.53 |
| 2,230,837 A * | 2/1941 | Boyd | ............... | F16D 51/48 188/79.56 |
| 2,804,177 A * | 8/1957 | Helvern | ............... | F16D 51/48 188/79.56 |
| 3,067,840 A * | 12/1962 | Werner | ............... | F16D 51/48 188/79.52 |
| 3,111,200 A * | 11/1963 | Philip | ............... | F16D 51/48 188/79.56 |
| 3,221,842 A * | 12/1965 | Shampton | ............... | F16D 65/565 188/79.56 |
| 3,352,383 A * | 11/1967 | Thompson | ............... | F16D 65/22 188/79.56 |
| 4,232,766 A | 11/1980 | Rupprecht | | |
| 4,424,888 A * | 1/1984 | Chouings | ............... | F16D 51/20 188/196 BA |
| 4,456,103 A | 6/1984 | Muscat | | |
| 4,623,046 A * | 11/1986 | Barnett | ............... | F16D 65/565 188/196 BA |
| 4,627,521 A | 12/1986 | Takagaki et al. | | |
| 5,062,504 A | 11/1991 | Yamamoto | | |
| 6,328,141 B1 * | 12/2001 | Asai | ............... | F16D 51/20 188/196 BA |
| 6,354,411 B1 | 3/2002 | Asai et al. | | |
| 7,070,025 B2 | 7/2006 | Maeh | | |
| 2001/0018999 A1 * | 9/2001 | Hasegawa | ............... | F16D 65/22 188/78 |

\* cited by examiner

ONE-WAY AND TWO-WAY BRAKE AUTO-ADJUSTERS

RELATED APPLICATIONS

This application claims the benefit of U.S. Provisional Application No. 62/562,605 filed Sep. 25, 2017, which is incorporated herein by reference.

FIELD OF INVENTION

The present invention relates generally to brake assemblies, and more particularly to brake assemblies that are suitable for use in light vehicles such as zero-turn radius mowing machines and comparable vehicles.

BACKGROUND

A prime mover, such as an internal combustion engine or the like, can be connected to a hydrostatic transmission to drive a wheel in a light vehicle. Exemplary light vehicles include turf machines, lawn tractors, ride-on lawn mowers, and like vehicles, including for example zero-turn radius vehicles such as zero-turn radius mowers and tractors.

To slow the vehicle and/or bring the vehicle to a stop, a brake assembly typically is provided in or connected to the hydrostatic transmission to restrict or prevent rotational motion of a rotatable member, such as an output shaft connected to the wheels. In some brake assemblies, a hub or rotor is connected to the rotatable member and a friction member engages the hub to restrict motion through frictional brake torque. A common configuration of such a brake assembly is referred to as a drum brake. In a drum brake configuration, an actuator mechanism is employed by the vehicle operator to initiate braking. The brake assembly further may include one or more brake shoes, each having an outer brake pad fixed to the shoe. When the brake is actuated, the brake shoes with the brake pads are forced against an inner diameter of the brake drum. Friction of the brake shoe pads against the drum prevents rotation of the output shaft, and thereby prevents rotation of the wheel.

Repeated application of the brake assembly over time results in wear of the brake assembly components, and the drum and brake pads in particular. Although wear issues are associated with drum brakes on any vehicle type, such issues particularly are pronounced in smaller light vehicles, such as for example zero-turn radius mowers and tractors, which experience a relatively high brake load level. As the brake pads in particular wear down, the actuation stroke lengthens and ultimately may become too long to achieve proper torque and mechanical advantage for efficient braking. Wear, therefore, can necessitate frequent replacement of the brake assembly components, which is costly and time consuming.

SUMMARY OF INVENTION

The present disclosure describes an enhanced brake assembly that addresses component wear issues that are common in conventional configurations. An aspect of the invention is an enhanced brake assembly that addresses the lack of brake holding torque due especially to brake pad wear. The brake assembly automatically adjusts the brake shoe positioning as the brake shoe pads wear to shorten the necessary stroke length to maintain proper torque and mechanical advantage for efficient braking. The automatic adjustment extends the useful life of the brake assembly components as compared to conventional configurations. In exemplary embodiments, the automatic adjustment occurs in response to application of brake torque in one direction, and the forward direction in particular. In other exemplary embodiments, the automatic adjustment occurs in response to application of brake torque in two directions, such as both in the forward and reverse directions.

In exemplary embodiments of an auto-adjustment brake mechanism, a brake assembly includes an adjusting link installed between the shoes of a drum brake assembly, an adjusting lever attached to a pivot point on the brake back plate, and an adjusting spring that can effect rotation of the adjusting lever upon release of the brake. As the brake pads on the brake shoes wear with use, the brake shoes travel a longer distance to engage the inner diameter of the drum during operation. In conventional configurations, this increased travel often leads to reduced actuation force, which leads to reduced holding torque. To address such issue, movement of the brake shoes causes the adjusting lever to pivot about the pivot point when the brake actuates. The adjusting lever pivots more with increasing brake pad wear as the brake shoes must travel further, and when the brake pads wear enough, the adjusting lever will overlap a next one of teeth on the adjusting link. When the brake is released, the adjusting spring pulls the adjusting lever, causing the adjusting lever to pivot in the opposite direction relative to the rotation caused by the brake shoes. As the adjusting lever pivots in said opposite direction, an end of the adjusting lever catches a next one of the teeth on the adjusting link. As the adjusting spring returns the adjusting lever to its initial position, the pivoting adjusting lever rotates the adjusting link by one tooth increment, which tightens the brake assembly.

Accordingly, the brake assembly of the present disclosure provides for an enhanced auto-adjustment mechanism that can adapt to brake shoe wear by decreasing the stroke length. In exemplary embodiments, a brake assembly includes a friction member such as for example a brake drum; a brake shoe that interacts against the friction member to apply a braking torque when the brake assembly is actuated; and an auto-adjustment mechanism that automatically adjusts an unloaded state position of the brake shoe relative to the friction member. The auto-adjustment mechanism includes an adjusting link that is rotatable to adjust the unloaded state position of the brake shoe, and an adjusting lever that operates to rotate the adjusting link during a release of the braking assembly to adjust the unloaded state position of the brake shoe. The auto-adjustment mechanism includes a pivot point mounted on the brake back plate about which the adjusting lever rotates, and an adjusting spring attached to the adjusting lever. The adjusting lever rotates in a first direction against the spring force when the brake assembly is actuated, and the adjusting spring by operation of the spring force rotates the adjusting lever in the second direction when the brake assembly is released. During the brake release, as the adjusting lever rotates back the adjusting lever may catch the adjusting link in a ratchet fashion to rotate the adjusting link to adjust the unloaded state position of the brake shoes.

The brake assembly may be configured to have either a one-way adjustment configuration or a two-way adjustment configuration. In a one-way adjustment configuration, there is a single adjusting lever, and the adjusting spring attaches the adjusting lever to a pin fixed to the brake back plate on the opposite side of the brake assembly relative to the adjusting lever. The adjusting lever only operates with one direction of brake loading, e.g., in a forward or clockwise direction, because the actuation lever pivot pin has sufficient clearance to allow the end of one brake shoe to contact a typical H-bracket of the brake when torque is applied to the brake. Since the adjusting lever is cycled by the shoe over which it is mounted, the adjusting lever will not cycle if that shoe remains in contact with the H-bracket while under load. For a one-way brake adjustment mechanism, a single adjusting lever is provided that operates in the described manner.

The brake assembly alternatively may be configured as a two-way brake adjustment mechanism. In a two-way brake adjustment mechanism, two adjusting levers are attached to respective pivot points on the brake back plate, and the adjusting spring attaches the two adjusting levers to each other. Each adjusting lever operates with one direction of brake loading, because a respective actuation lever pivot pin has sufficient clearance to allow the end of one respective brake shoe to contact the H-bracket when torque is applied to the brake. Since a respective adjusting lever is cycled by the shoe over which said adjusting lever is mounted, the respective adjusting lever will not cycle if that brake shoe remains in contact with the H-bracket while under load. To adjust the brake for both directions of brake loading, an adjusting lever therefore is provided over each shoe to accommodate either direction of brake loading (e.g., forward or reverse directions).

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 1:
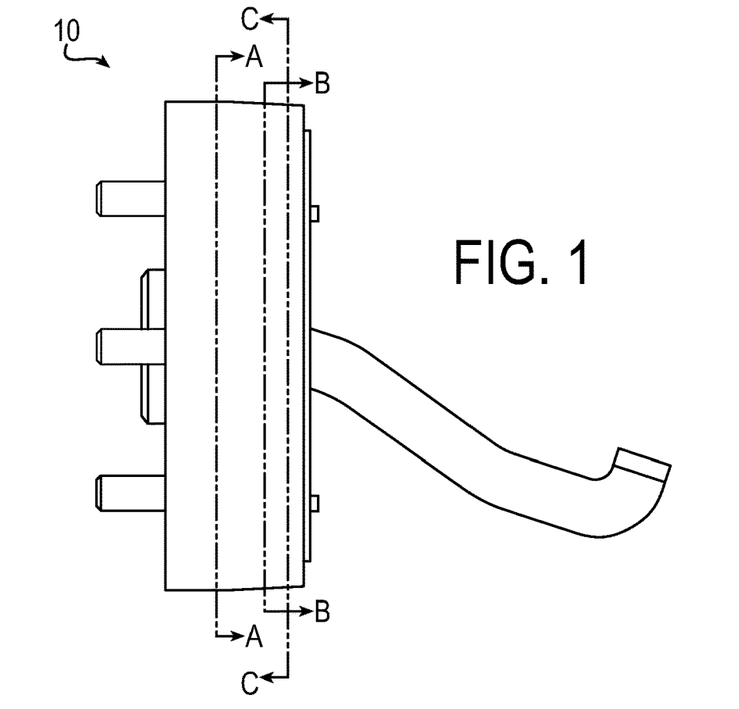
FIG. 1 is a drawing depicting a side cross-sectional view of an exemplary one-way adjustment brake assembly in accordance with embodiments of the present invention, with the brake assembly in an unloaded state.
Figure 2:
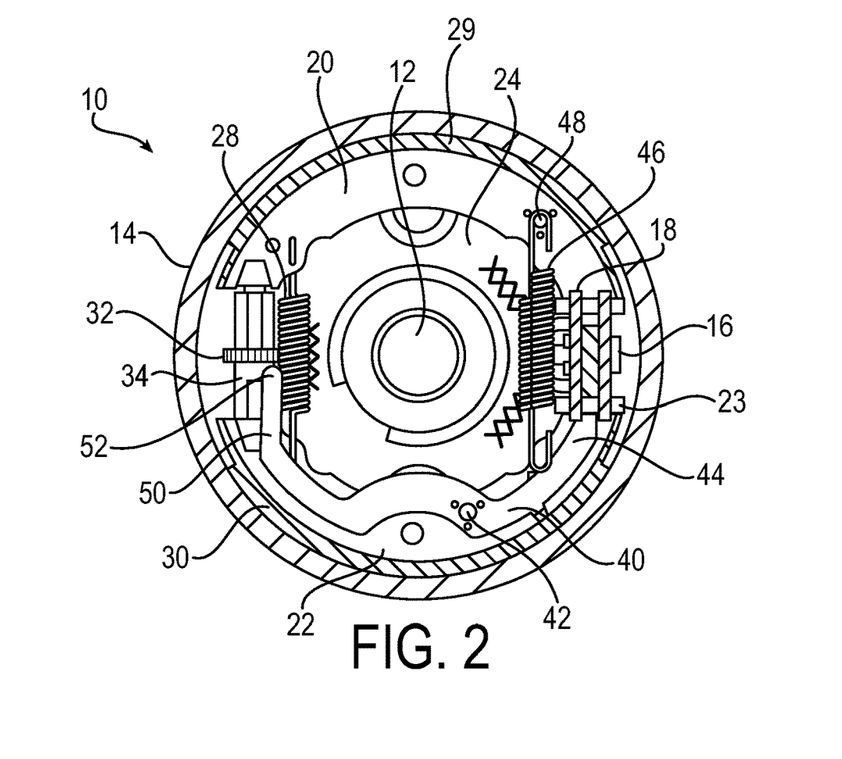
FIG. 2 is a drawing depicting a cross-sectional view of the exemplary brake assembly of FIG. 1 along the section C-C.
Figure 3:
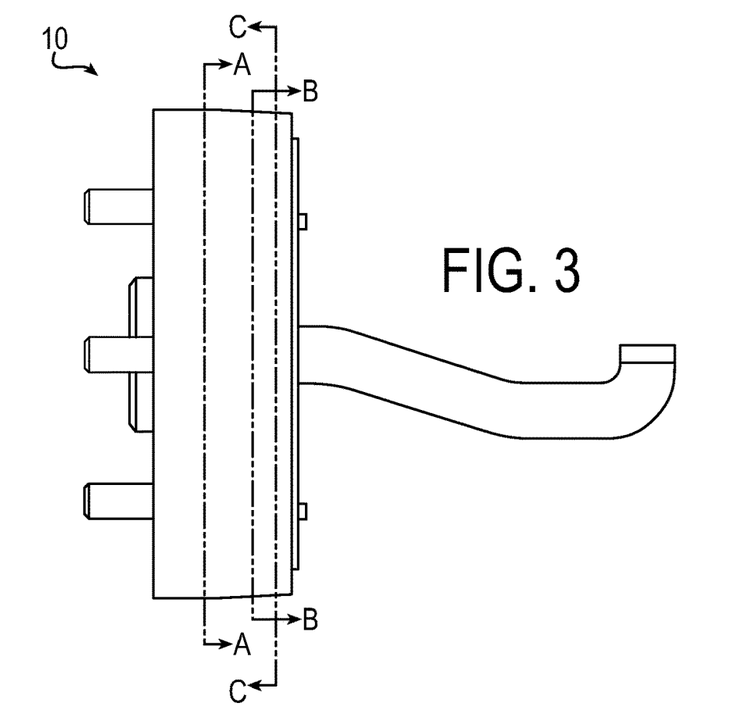
FIG. 3 is a drawing depicting a side cross-sectional view of the exemplary one-way adjustment brake assembly of FIG. 1, with the brake assembly in a loaded state.
Figure 4:
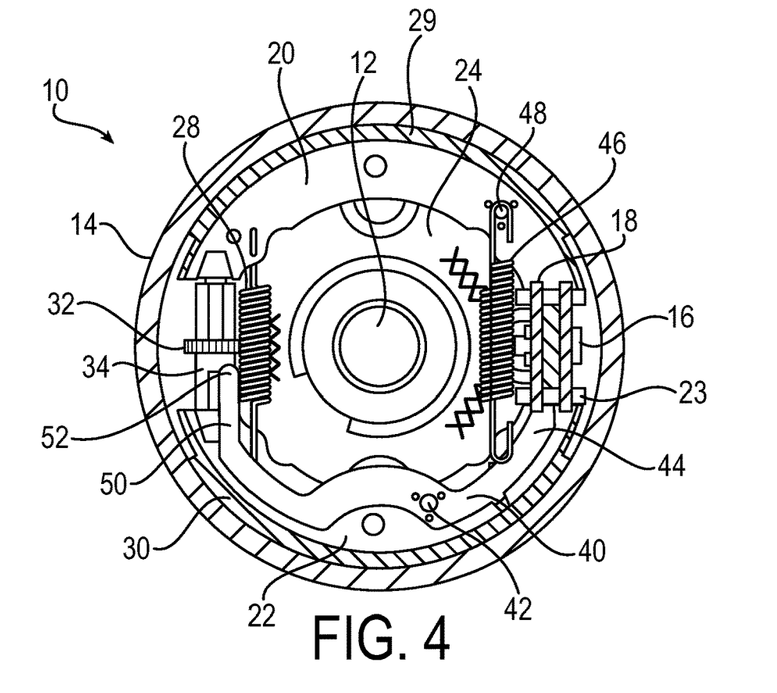
FIG. 4 is a drawing depicting a cross-sectional view of the exemplary brake assembly as depicted in FIG. 3 along the section C-C.
Figure 5:
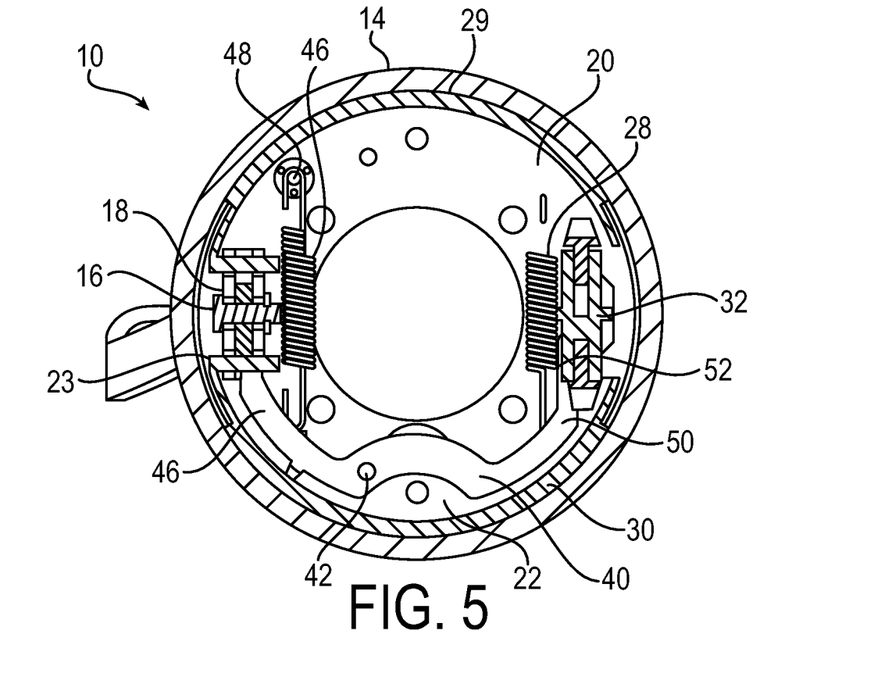
FIG. 5 is a drawing depicting a cross-sectional view of the exemplary brake assembly as depicted in FIG. 3 along the section B-B.
Figure 6:
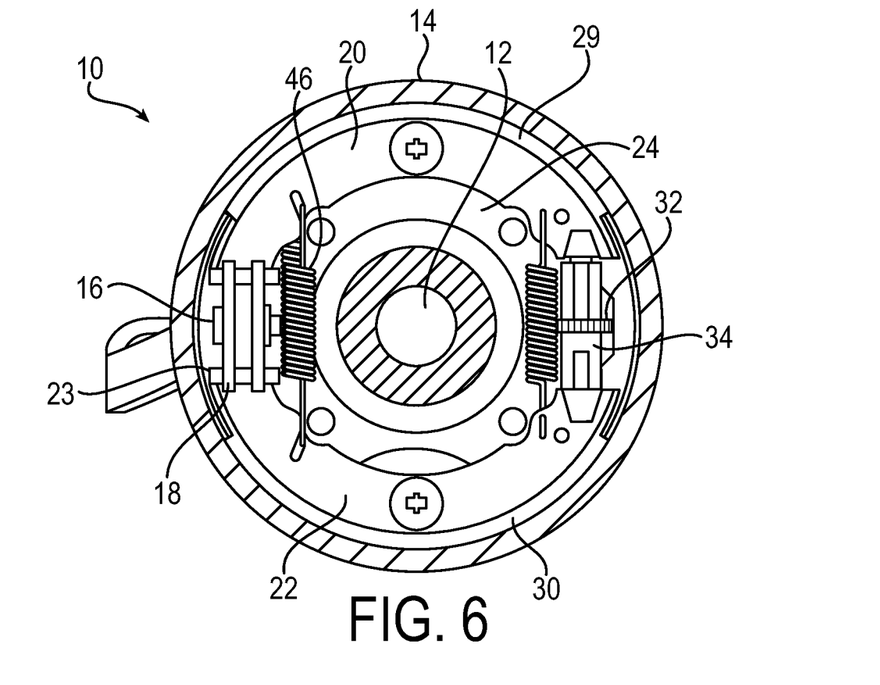
FIG. 6 is a drawing depicting a cross-sectional view of the exemplary brake assembly as depicted in FIG. 3 along the section A-A.

FIGS. 1-6 are drawings depicting various sectional views of an exemplary one-way adjustment brake assembly 10 in accordance with embodiments of the present invention. FIGS. 1 and 2 depict the brake assembly 10 in an unloaded state (i.e., the brake is released), and FIGS. 3-6 depict the brake assembly 10 in a loaded state (i.e., the brake is actuated).

The brake assembly 10 includes a friction member and at least one brake shoe that interacts against the friction member to apply a braking torque when the brake assembly is actuated. The brake assembly 10 may be configured as a drum brake including a braking mechanism attached to a rotating output shaft 12 that is encompassed within an outer cylindrical brake drum 14 that acts as the friction member. The output shaft 12 may be connected to a wheel hub such that rotation of the output shaft in turn drives rotation of a vehicle wheel, and the brake assembly 10 may be employed to slow and/or stop the rotation of the output shaft. The brake assembly 10 is suitable for use in light vehicles such as, for example, turf machines, lawn tractors, ride-on lawn mowers, and like vehicles, including zero-turn radius vehicles such as zero-turn radius mowers and tractors. The auto-adjustment mechanism of the brake assembly 10, described in detail below, can adjust the brake stroke automatically in the context of the high loads associated with braking in such smaller types of light vehicles. In such vehicles, the brake assembly 10 may be mounted on a hydrostatic transmission or hydraulic motor that drives the wheels, usually one or both of the rear wheels in particular. It will be appreciated, however, that the brake assembly described in this disclosure is not limited to any particular vehicle type, and may be employed broadly to any suitable vehicle type, or even in other applications in which braking of a rotating member may be performed.

The brake assembly 10 transitions between an unloaded stated and a loaded state, wherein the brake assembly is actuated to transition from the unloaded state to the loaded state and is released to transition from the loaded state to the unloaded state. When a vehicle operator actuates braking, as is conventional, brake torque is applied through an actuation lever (not shown), with the brake actuation being transmitted through a pivot pin 16 mounted via an H-bracket 18. The brake assembly 10 further may include one or more brake shoes that are moveable by the actuation lever to provide a friction interaction against an inner surface of the brake drum 14. In the depicted example, the brake assembly 10 includes brake shoes 20 and 22 that are mounted to a brake back plate 24, and the brake shoes are connected to each other by second connecting springs 28, whereby the connecting springs 28 spring mount the brake shoes. In this manner, brake actuation, depending by the direction of braking, forces at least one of the brake shoes against an inner surface of the brake drum, and upon release of braking, the connecting springs return the brake shoes to their initial position of the unloaded state (referred to herein as the unloaded state position). An outer surface of each brake shoe 20 and 22 is provided with a respective brake pad 29 and 30 to provide the friction surface that interacts against the inner surface of the friction member/brake drum 14.

As referenced above, FIGS. 1 and 2 illustrate the brake assembly 10 in an unloaded state, i.e., a state in which no brake torque is applied. FIGS. 3-6 illustrate the brake assembly 10 in a loaded state, i.e., a state in which the brake is actuated and brake torque is applied. When the brake is actuated, the braking torque is generated by the brake shoes as the brake actuation forces the shoes outward against the connecting spring forces thereby placing the brake assembly in the loaded state. The positioning of the brake shoes in the loaded state versus the unloaded state is shown in a comparison of FIGS. 1-2 versus FIGS. 3-4, for example. When the brake shoes 20 and 22 are moved by the brake actuation, the brake pads 29 and 30 contact an inner surface of the brake drum 14. Friction between the brake pads of the brake shoes and the brake drum provides the braking torque that slows and ultimately stops rotation of the output shaft 12, thereby slowing and/or stopping rotation of the vehicle wheels. When the brake is released and the brake torque is removed, the spring forces bring the brake shoes back to their initial position in the unloaded state.

Generally, the brake assembly provides for an enhanced auto-adjustment mechanism that can adapt to brake shoe wear by decreasing the stroke length. In exemplary embodiments, a brake assembly includes a friction member such as for example a brake drum; a brake shoe that interacts against the friction member to apply a braking torque when the brake assembly is actuated; and an auto-adjustment mechanism that automatically adjusts an unloaded state position of the brake shoe relative to the friction member. The auto-adjustment mechanism includes an adjusting link that is rotatable to adjust the unloaded state position of the brake shoe, and an adjusting lever that operates to rotate the adjusting link during a release of the braking assembly to adjust the unloaded state position of the brake shoe. The auto-adjustment mechanism includes a pivot point mounted on the brake back plate about which the adjusting lever rotates, and an adjusting spring attached to the adjusting lever. The adjusting lever rotates in a first direction against the spring force when the brake assembly is actuated, and the adjusting spring by operation of the spring force rotates the adjusting lever in a second direction when the brake assembly is released. During the brake release, as the adjusting lever rotates back the adjusting lever may catch the adjusting link in a ratchet fashion to rotate the adjusting link to adjust the unloaded state position of the brake shoes.

Referring to the figures, the brake assembly 10 includes an auto-adjustment mechanism that can adjust the unloaded state position of the brake shoes to accommodate wear of the brake pads. As the brake pads on the brake shoes wear with use, the brake shoes must travel a longer distance to engage the inner diameter of the drum during operation. In conventional configurations, this increased travel often leads to reduced actuation force, which leads to reduced holding torque. The present disclosure describes an enhanced brake assembly that addresses such wear issues that are common in conventional configurations. Generally, the brake assembly 10 automatically adjusts the unloaded state position of the brake shoes as the brake shoe pads wear to shorten the necessary stroke length. The automatic adjustment extends the useful life of the brake assembly components as compared to conventional configurations. In exemplary embodiments, the automatic adjustment occurs in response to application of brake torque in one direction, and the forward direction in particular. In other exemplary embodiments, the automatic adjustment occurs in response to application of brake torque in either of two directions, such as both in the forward and reverse directions.

As referenced above, FIGS. 1-6 are drawings depicting a one-way adjustment brake assembly 10. For automatic adjustment, the brake assembly 10 includes an adjusting link 32 installed between the two brake shoes 20 and 22, which is rotatable to adjust the unloaded state position of the brake shoes as further described below. The adjusting link 32 includes teeth 34 that run the length of the adjusting link 32, and the teeth 34 interact with the connecting spring 28 that connects to the two brake shoes. The teeth 34 may be cut into a star shape with a sawtooth configuration that provides a surface-to-surface ramp with respect to the coils of the spring 28. Accordingly, a coil portion of the spring 28 fits between points of the sawtooth to prevent the adjusting link 32 from turning. To adjust the positioning of the brake shoes 20 and 22, the adjusting link 32 must be adjusted, which is accomplished by rotating the adjusting link 32 against the spring force of the connecting spring 28. With this rotation, the ramped surfaces of the teeth 34 operate to stretch the connecting spring 28. By stretching the spring in this manner, the brake shoes can be repositioned for the unloaded state further outward relative to each other, which shortens the stroke length required to bring the brake pads 29 and 30 into contact with the inner diameter surface of the brake drum 14.

In embodiments of the brake assembly configuration described in this disclosure, the adjustment of the adjusting link 32 is accomplished by operation of an adjusting lever 40 that operates to rotate the adjusting link during a release of the brake assembly to adjust the unloaded state position of the brake shoes. The adjusting lever 40 is rotatably mounted to the brake back plate 24 via a pivot point 42 about which the adjusting lever 40 rotates. In particular, the adjusting lever rotates about the pivot point in a first direction when the brake assembly is actuated and in a second direction opposite from the first direction when the brake assembly is released. The pivot point 42 may be configured as a pin, rod, or comparable cylindrical member that permits the adjusting lever 40 to rotate relative to the brake back plate 24. The adjusting lever 40 includes a first arm 44 that permits a spring loading of the adjusting lever 40. In particular, an adjusting spring 46 is attached at a first end to the first arm 44 of the adjusting lever 40. A second end of the adjusting spring 46 opposite from the first end is connected to a pin 48 fixed to or mounted on the brake back plate 24. In this manner, the adjusting lever 42 is mounted over or adjacent to the brake shoe 22. The adjusting lever 40 further may include a second arm 50 opposite to the first arm 44. The second arm 50 has a ratcheting end 52 that interacts with the teeth 34 to rotate and adjust the adjusting link 32 as follows.

When the brake is actuated by the vehicle operator, the adjusting lever 40 will pivot clockwise about the pivot point 42. In particular, as the brake shoe 22 moves by the brake actuation toward the brake drum, the end of the first arm 44 is contacted by an end pad 23 on the brake shoe 22 over which the adjusting lever 40 is mounted. As the brake shoe 22 moves outward toward the brake drum, the interaction of the end pad 23 against the arm 44 of the adjusting lever 40 drives the adjusting lever 40 causing the adjusting lever 40 to rotate in a first direction, i.e. clockwise, about the pivot point 42 against the force of the adjusting spring 46. Ultimately, such pivoting permits the adjusting lever to engage one of the teeth 34 on the adjusting link 32, as further described below. When the brake is released, the adjusting spring 46 pulls the adjusting lever 40 back towards its initial position of the unloaded brake state, causing the adjusting lever 40 to pivot back in a second direction opposite relative to the first direction caused by the driving of the brake shoe 22, i.e. counterclockwise, about the pivot point 42.

As the brake pads 29 and 30 wear over time thereby increasing the stroke length, the adjusting lever 40 pivots in the first clockwise direction more and more with brake actuation. When the brake pads wear enough, the adjusting lever 40 rotates in the first direction (clockwise) sufficiently for the ratcheting end 52 of the adjusting lever to overlap a next one of the teeth 34 on the adjusting link 32. When the brake is released, and the adjusting spring 46 then pulls the adjusting lever 40 in the second opposite direction (counterclockwise), the ratcheting end 52 catches the next tooth 34 of the adjusting link 32, which rotates the adjusting link by one tooth increment. Rotation of the adjusting link 32 in turn tightens the brake by spreading the brake shoes 20 and 22 further apart from each other in the unloaded state, i.e., moving the brake shoes and brake pads closer to the inner surface of the brake drum 14 thereby decreasing the requisite stroke length.

The example configuration of FIGS. 1-6 has a one-way brake adjustment mechanism. Generally, in a one-way adjustment configuration, the adjusting lever operates to rotate the adjusting link during a release of the braking assembly following actuation of the brake assembly in only one direction of brake loading. Accordingly, in a one-way adjustment configuration, there is a single adjusting lever 40, and the adjusting spring 46 extends between the first arm 44 and the pin 48 mounted on the brake back plate 24. The adjusting lever 40 only operates with one direction of brake loading, e.g., in a forward or clockwise direction, because the brake actuation lever pivot pin 16 has sufficient clearance to allow the end of one brake shoe 22 to contact a typical H-bracket 18 of the brake when torque is applied to the brake. Since the adjusting lever is cycled by the brake shoe 22 over which the adjusting lever 40 is mounted, the adjusting lever will not cycle if that shoe remains in contact with the H-bracket 18 while under load.

Figure 7:
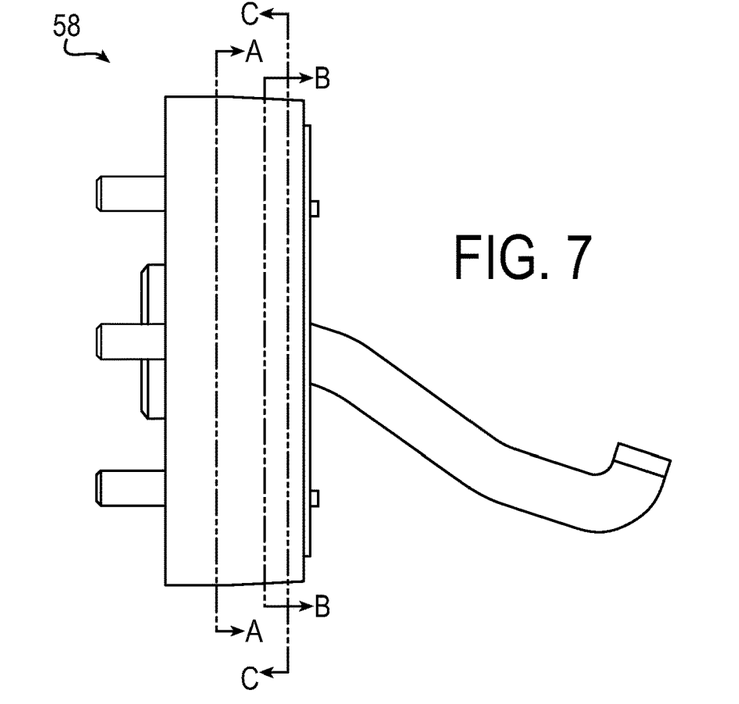
FIG. 7 is a drawing depicting a side cross-sectional view of an exemplary two-way adjustment brake assembly in accordance with embodiments of the present invention, with the brake assembly in an unloaded state.
Figure 8:
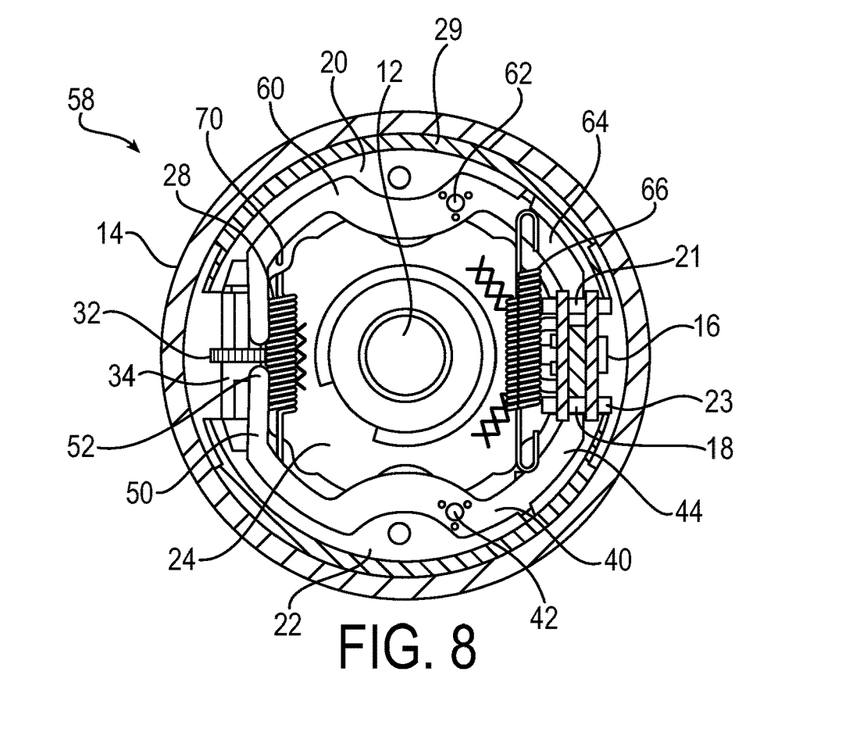
FIG. 8 is a drawing depicting a cross-sectional view of the exemplary brake assembly of FIG. 7 along the section C-C.
Figure 9:
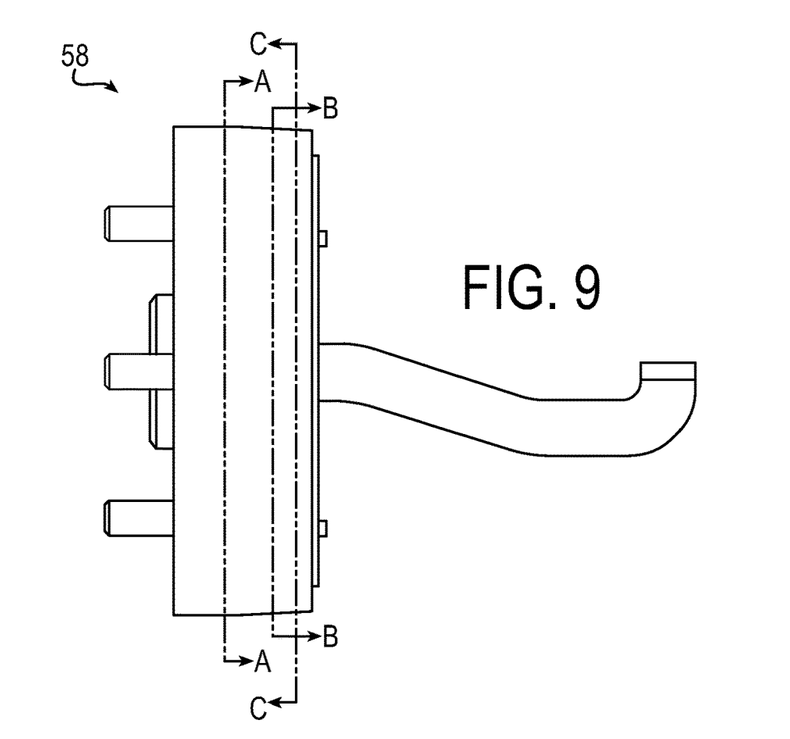
FIG. 9 is a drawing depicting a side cross-sectional view of the exemplary two-way adjustment brake assembly of FIG. 7, with the brake assembly in a loaded state.
Figure 10:
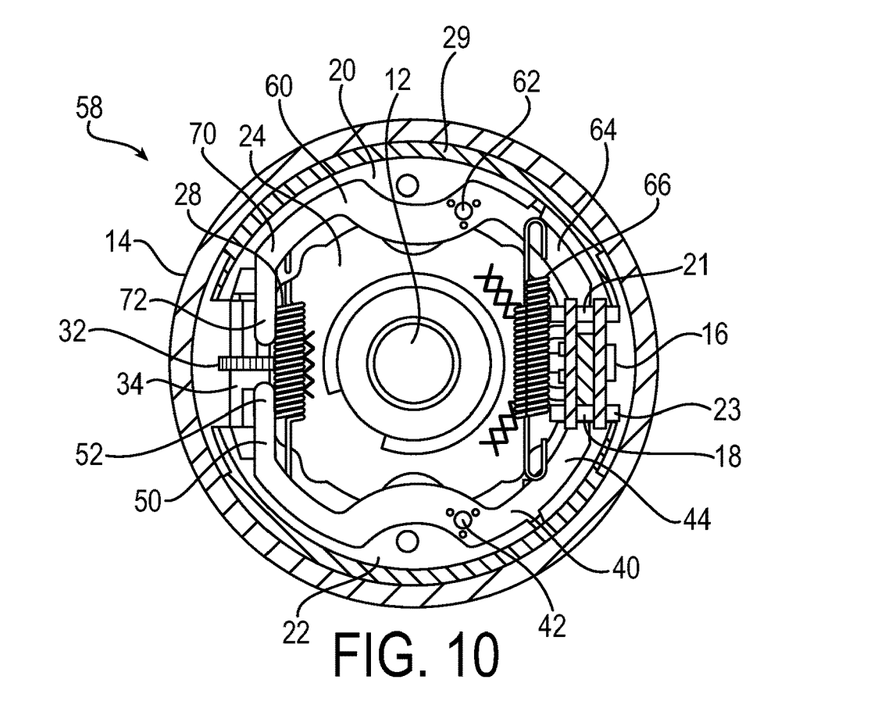
FIG. 10 is a drawing depicting a cross-sectional view of the exemplary brake assembly as depicted in FIG. 9 along the section C-C.
Figure 11:
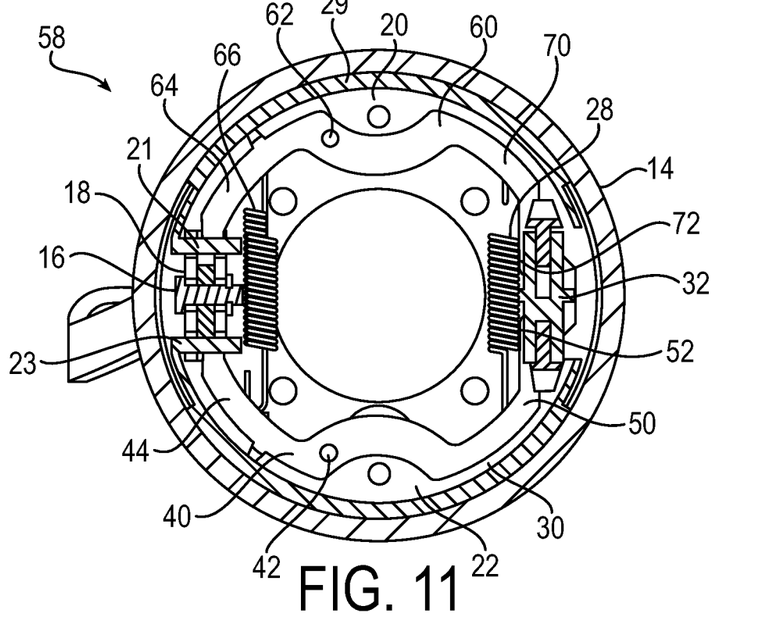
FIG. 11 is a drawing depicting a cross-sectional view of the exemplary brake assembly as depicted in FIG. 9 along the section B-B.
Figure 12:
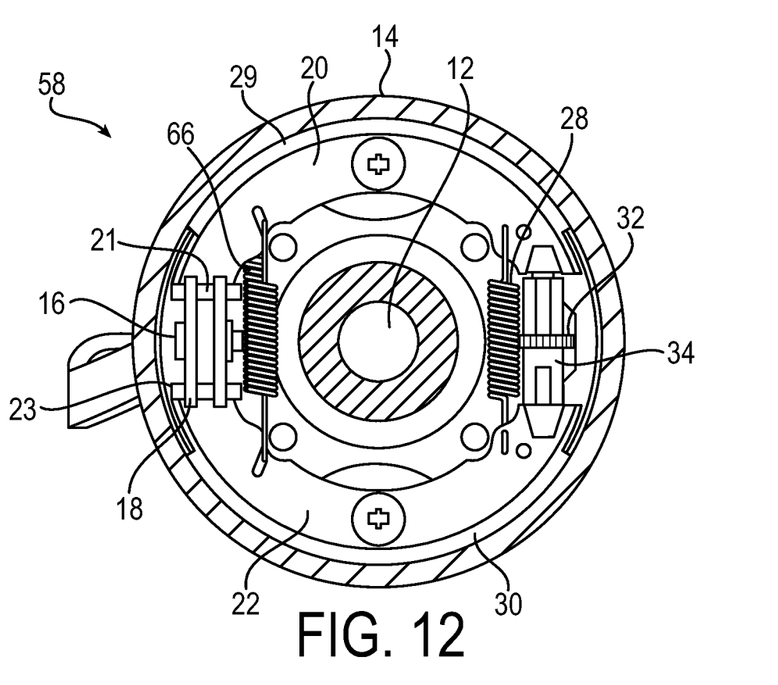
FIG. 12 is a drawing depicting a cross-sectional view of the exemplary brake assembly as depicted in FIG. 9 along the section A-A.
Figure 13:
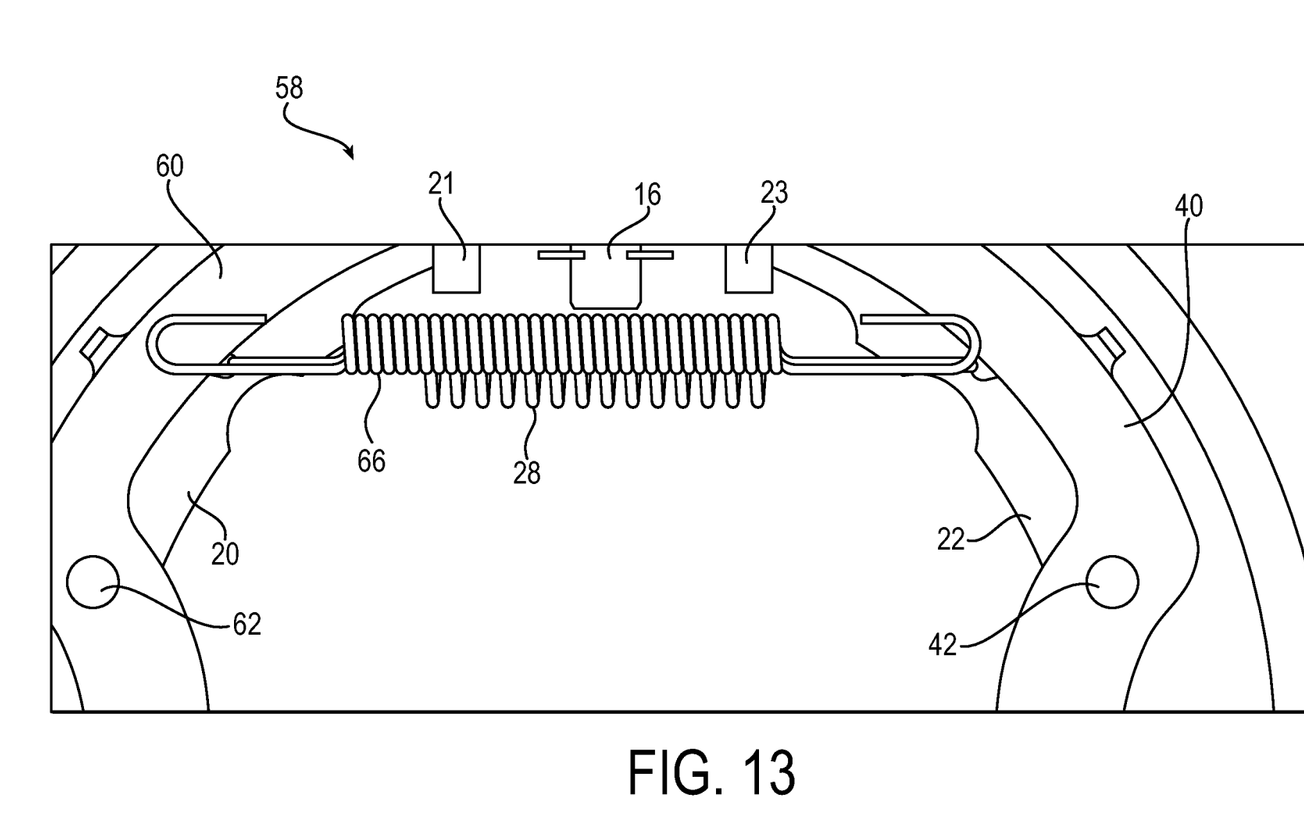
FIG. 13 is a drawing depicting a cross-sectional view of a portion of the auto-adjustment mechanism of the two-way adjustment brake assembly.

The brake assembly alternatively may be configured as a two-way brake adjustment mechanism. FIGS. 7-13 are drawings depicting various sectional views of an exemplary two-way adjustment brake assembly 58 in accordance with embodiments of the present invention. FIGS. 7 and 8 depict the brake assembly 58 in an unloaded state (i.e., the brake is released) similarly as FIGS. 1 and 2, and FIGS. 8-12 depict the brake assembly 58 in a loaded state (i.e., the brake is actuated) similarly as FIGS. 3-6. FIG. 13 is a drawing depicting a cross-sectional close-up view of a portion of the auto-adjustment mechanism of the two-way adjustment brake assembly 58. The two-way adjustment brake assembly 58 has features in common with the one-way adjustment brake assembly 10 of FIGS. 1-6. Accordingly, like components are identified with common reference numerals in FIGS. 7-13 as in FIGS. 1-6.

Generally, in a two-way brake adjustment mechanism, two adjusting levers are attached to respective pivot points on the brake back plate, and an adjusting spring attaches the two adjusting levers to each other. A first adjusting lever operates to rotate the adjusting link during a release of the braking assembly following actuation of the brake assembly in a first direction of brake loading, and a second adjusting lever operates to rotate the adjusting link during a release of the braking assembly following actuation of the brake assembly in a second direction of brake loading. Accordingly, each adjusting lever operates with one direction of brake loading, because the brake actuation lever pivot pin has sufficient clearance to allow the end of one respective brake shoe to contact the H-bracket when torque is applied to the brake. Since a respective adjusting lever is cycled only by the respective brake shoe over which said adjusting lever is mounted, the respective adjusting lever will not cycle if that brake shoe remains in contact with the H-bracket while under load. To adjust the brake for both directions of brake loading, therefore, an adjusting lever is provided over each brake shoe to accommodate either direction of brake loading (e.g., forward or reverse directions).

Referring to FIGS. 7-13, similarly as in the previous embodiment, when the brake is actuated, depending on the direction of brake loading the brake shoe 20 or 22 is forced outward against the connecting spring forces thereby generating the braking torque to place the brake assembly in the loaded state. The positioning of the brake shoes in the loaded state versus the unload state is shown in a comparison of FIGS. 7-8 versus FIGS. 9-10, for example. When the brake shoes 20 and 22 are moved by the braking actuation, the brake pads 29 and 30 contact an inner surface of the brake drum 14 to generate the braking torque. Again, friction between the brake pads of the brake shoes and the brake drum surface slows and ultimately stops rotation of the output shaft 12, thereby slowing and/or stopping rotation of the vehicle wheels. When the brake is released and the brake torque is removed, the spring forces bring the brake shoes back to their initial position in the unloaded state.

The brake assembly 58 includes the two-way auto-adjustment mechanism that can adjust the positioning of the brake shoes in the unloaded state to accommodate wear of the brake pads. As described above, when the brake pads on the brake shoes wear with use, the brake shoes travel a longer distance to engage the inner diameter of the drum during operation. In conventional configurations, this increased travel often leads to reduced actuation force, which leads to reduced holding torque. Generally, the brake assembly 58 similarly automatically adjusts the brake shoe positioning as the brake shoe pads wear to shorten the necessary stroke length.

For automatic adjustment, the brake assembly 58 having a two-way adjustment mechanism also includes the adjusting link 32 with teeth 34 installed between the two brake shoes 20 and 22 comparably as in the one-way adjustment mechanism. A coil portion of the connecting spring 28 likewise fits between points of the sawtooth 34 to prevent the adjusting link 32 from turning. To adjust the positioning of the brake shoes 20 and 22, the adjusting link 32 is adjusted by rotating the adjusting link against the spring force of the spring 28. With this rotation, the ramped surfaces of the teeth 34 operate to stretch the spring 28 to shorten the stroke length.

In embodiments of the brake assembly 58 having the two-way adjustment mechanism, such embodiment also includes the first adjusting lever 40 similarly as in the previous embodiment. The adjusting lever 40 is rotatably mounted to the brake back plate 24 via the first pivot point 42 and operates in the manner described above. The embodiment of FIGS. 7-13 further includes a second adjusting lever 60, which is rotatably mounted to the brake back plate 24 via a second pivot point 62. The second pivot point 62 also may be configured as a pin, rod, or comparable cylindrical member that permits the second adjusting lever 60 to rotate relative to the brake back plate 24. The second adjusting lever 60 may be configured comparably as the first adjusting lever 40. In the two-way adjustment configuration, an adjusting spring 66 connects the two adjusting levers 40 and 60 to each other, and the pin 48 of the one-way adjustment configuration is therefore absent. Rather, the first adjusting lever 40 includes the first arm 44, and the second adjusting lever 60 similarly includes a first arm 64, with the respective first arms 44 and 64 permitting a spring loading of the adjusting levers 40 and 60. In particular, the adjusting spring 66 is connected at one end to the first arm 44 of the first adjusting lever 40, and further is connected at a second end opposite from the first end to the first arm 64 of the second adjusting lever 60. These connections are seen best in the close-up view of FIG. 13. The first adjusting lever 40 again may include the second arm 50 opposite to the first arm 44. The second arm 50 has the first ratcheting end 52 that interacts with the teeth 34 to adjust the adjusting link 32. Similarly, the second adjusting lever 60 may include a second arm 70 opposite to the first arm 64. The second arm 70 has a second ratcheting end 72 that interacts with the teeth 34 to adjust the adjusting link 32.

In the two-way adjustment mechanism, when the brake is actuated and the braking torque is applied in a first direction (e.g., forward), the first adjusting lever 40 will pivot clockwise about the first pivot point 42, and when the braking torque is applied in a second direction (e.g., reverse), the second adjusting lever 60 will pivot counterclockwise about the second pivot point 62 because the adjusting levers essentially are positioned mirror imaged relative to each other. Similarly as in the previous embodiment, when the braking load is applied in the first direction, the end of the first arm 44 of the first adjusting lever 40 is contacted by an end pad 23 on the brake shoe 22 over which the first adjusting lever 40 is mounted. As the brake shoe 22 moves outward toward the brake drum, the interaction of the end pad 23 against the first arm 44 of the first adjusting lever 40 drives the first adjusting lever 40 causing the first adjusting lever 40 to rotate in a first direction, i.e. clockwise, about the first pivot point 42 against the force of the adjusting spring 66. Similarly, when braking torque is applied in the second direction the end of the first arm 64 of the second adjusting lever 60 is contacted by an end pad 21 on the brake shoe 20 over which the second adjusting lever 60 is mounted. As the brake shoe 20 moves outward toward the brake drum, the interaction of the end pad 21 against the first arm 64 of the second adjusting lever 60 drives the second adjusting lever 60 causing the second adjusting lever 60 to rotate in the second direction, i.e. counterclockwise, about the pivot point 62 against the force of the adjusting spring 66. When the brake is released, the adjusting spring 66 pulls the first adjusting lever 40 back towards its initial position of the unloaded brake state, causing the first adjusting lever 60 to pivot back in the second direction opposite relative to the first direction caused by the driving of the brake shoe 22, i.e. counterclockwise, about the first pivot point 42. Similarly, the adjusting spring 66 pulls the second adjusting lever 60 back towards its initial position of the unloaded brake state, causing the second adjusting lever 60 to pivot back in the first direction opposite relative to the second direction caused by the driving of the brake shoe 20, i.e. clockwise, about the pivot point 62.

The second arm 50 of the first actuating lever 40 has the first ratcheting end 52 that interacts with the teeth 34 to adjust the adjusting link 32, and the second arm 70 of the second actuating lever 60 has the second ratcheting end 72 that interacts with the teeth 34 to adjust the adjusting link 32. In particular, as the brake shoes 20 or 22 are moved by the brake actuation, the brake shoes drive the adjusting levers 40 and 60 causing the adjusting levers 40 and 60 to rotate in their respective directions about their respective pivot points 42 and 62 to permit one or the other the adjusting levers to engage one of the teeth 34 on the adjusting link 32. As the brake pads 29 and 30 wear over time thereby increasing the stroke length, the adjusting levers 40 and 60 pivot more and more with brake actuation. When the brake pads wear enough, the adjusting levers 40 and 60 rotate sufficiently, depending upon the brake loading direction, for one of the ratcheting ends 52 or 72 of the adjusting levers to overlap a next one of the teeth 34 on the adjusting link 32. When the brake is then released, the adjusting spring 66 pulls the adjusting lever 40 or 60, causing the adjusting lever 40 or 60 to pivot back in the opposing direction about the respective pivot points 42 or 62.

Depending upon the direction of brake loading, upon sufficient brake pad wear, either the first ratcheting end 52 or the second ratcheting end 72 will then catch a next tooth 34 of the adjusting link 32, which rotates the adjusting link by one tooth increment. As in the previous embodiment, rotation of the adjusting link 32 in turn tightens the brake by spreading the shoes 20 and 22 further apart from each other in the unloaded state, i.e., moving the brake shoes and brake pads closer to the inner surface of the brake drum 14 thereby decreasing the requisite stroke distance. Accordingly, as referenced above, in the two-way configuration of FIGS. 8-13, each respective adjusting lever 40 and 60 operates with one direction of brake loading, because the respective actuation lever pivot point has sufficient clearance to allow the end of one respective brake shoe to contact the H-bracket when torque is applied to the brake. Since a respective adjusting lever is cycled by the respective brake shoe over which said adjusting lever is mounted, the respective adjusting lever will not cycle if that respective brake shoe remains in contact with the H-bracket while under load. To adjust the brake for both directions of brake loading, therefore, an adjusting lever is provided over each respective brake shoe to accommodate either direction of brake loading (e.g., forward or reverse directions).

An aspect of the invention is an enhanced auto-adjusting brake assembly that transitions between an unloaded stated and a loaded state, wherein the brake assembly is actuated to transition from the unloaded state to the loaded state and is released to transition from the loaded state to the unloaded state. In exemplary embodiments, the brake assembly includes a friction member, a brake shoe that interacts against the friction member to apply a braking torque when the brake assembly is actuated, and an auto-adjustment mechanism that automatically adjusts an unloaded state position of the brake shoe relative to the friction member. The auto-adjustment mechanism includes an adjusting link that is rotatable to adjust the unloaded state position of the brake shoe, and an adjusting lever that operates to rotate the adjusting link during a release of the braking assembly to adjust the unloaded state position of the brake shoe. The brake assembly may include one or more of the following features, either individually or in combination.

In an exemplary embodiment of the brake assembly, the auto-adjustment mechanism further comprises a pivot point about which the adjusting lever rotates, and the adjusting lever rotates about the pivot point in a first direction when the brake assembly is actuated and in a second direction opposite from the first direction when the brake assembly is released.

In an exemplary embodiment of the brake assembly, the brake shoe has an end that drives the adjusting lever to rotate the adjusting lever in the first direction when the brake assembly is actuated; the auto-adjustment mechanism comprises an adjusting spring attached to the adjusting lever; and the adjusting lever rotates in the first direction against the spring force when the brake assembly is actuated, and the adjusting spring by operation of the spring force rotates the adjusting lever in the second direction when the brake assembly is released.

In an exemplary embodiment of the brake assembly, the brake assembly includes a brake back plate and the pivot point is mounted to the brake back plate; that adjusting spring is attached at a first end to the adjusting lever; and the adjusting spring is attached at a second end opposite to the first end to a pin fixed to the brake back plate.

In an exemplary embodiment of the brake assembly, the adjusting lever has a first arm that is attached to the adjusting spring and a second arm that has a ratcheting end that operates to rotate the adjusting link.

In an exemplary embodiment of the brake assembly, the adjusting link has a plurality of teeth, and the ratcheting end of the adjusting lever catches a next one of the plurality of teeth during a release of the brake assembly to rotate the adjusting link.

In an exemplary embodiment of the brake assembly, the brake assembly further includes a connecting spring that spring mounts the brake shoe, wherein when the adjusting link rotates, teeth of the adjusting link interact with a coil portion of the connecting spring to stretch the connecting spring to adjust the unloaded state position of the brake shoe.

In an exemplary embodiment of the brake assembly, the brake shoe has a brake pad that interacts against the friction member to apply the braking torque when the brake assembly is actuated; when the brake assembly is actuated, the brake shoe moves over a stroke length, and the stroke length increases with wear of the brake pad; and the stroke length increases based on wear of the brake pad until the adjusting lever rotates in an amount sufficient for the ratcheting end to overlap the next one of the plurality of teeth to rotate the adjusting link during a release of the braking assembly to adjust the unloaded state position of the brake shoe.

In an exemplary embodiment of the brake assembly, the brake shoe has a brake pad that interacts against the friction member to apply the braking torque when the brake assembly is actuated; when the brake assembly is actuated, the brake shoe moves over a stroke length, and the stroke length increases with wear of the brake pad; and the stroke length increases based on wear of the brake pad until the adjusting lever rotates in an amount sufficient to rotate the adjusting link during a release of the braking assembly to adjust the unloaded state position of the brake shoe.

In an exemplary embodiment of the brake assembly, the friction member is a cylindrical brake drum, and the brake shoe interacts against an inner surface of the brake drum to apply the braking torque.

In an exemplary embodiment of the brake assembly, the adjusting lever operates to rotate the adjusting link during a release of the braking assembly to adjust the unloaded state position of the brake shoe following actuation of the brake assembly in only one direction of brake loading.

Alternatively, the brake assembly may be configured with a two-way adjustment brake mechanism. In exemplary embodiments of the brake assembly, therefore, the brake assembly includes a first brake shoe that interacts against the friction member to apply a braking torque when the brake assembly is actuated in a first direction of brake loading, and a second brake shoe that interacts against the friction member to apply a braking torque when the brake assembly is actuated in a second direction of brake loading. The auto-adjustment mechanism includes an adjusting link that is rotatable to adjust the unloaded state position of the brake shoes; a first adjusting lever mounted over the first brake shoe that operates to rotate the adjusting link during a release of the braking assembly to adjust the unloaded state position of the brake shoes following actuation of the brake assembly in the first direction of brake loading; and a second adjusting lever mounted over the second brake shoe that operates to rotate the adjusting link during a release of the braking assembly to adjust the unloaded state position of the brake shoes following actuation of the brake assembly in the second direction of brake loading.

In an exemplary embodiment of the brake assembly, the auto-adjustment mechanism further comprises: a first pivot point about which the first adjusting lever rotates, and the first adjusting lever rotates about the first pivot point in a first direction when the brake assembly is actuated in the first direction of brake loading, and in a second direction opposite from the first direction when the brake assembly is released; and a second pivot point about which the second adjusting lever rotates, and the second adjusting lever rotates about the second pivot point in the second direction when the brake assembly is actuated in the second direction of brake loading, and in the first direction when the brake assembly is released.

In an exemplary embodiment of the brake assembly, the first brake shoe has an end that drives the first adjusting lever to rotate the first adjusting lever in the first direction when the brake assembly is actuated in the first direction of brake loading, and the second brake shoe has an end that drives the second adjusting lever to rotate the second adjusting lever in the second direction when the brake assembly is actuated in the second direction of brake loading; the auto-adjustment mechanism comprises an adjusting spring that is connected at a first end to the first adjusting lever and is connected at a second end to the second adjusting lever; the first adjusting lever rotates in the first direction against the spring force when the brake assembly is actuated in the first direction of brake loading, and the adjusting spring by operation of the spring force rotates the first adjusting lever in the second direction when the brake assembly is released; and the second adjusting lever rotates in the second direction against the spring force when the brake assembly is actuated in the second direction of brake loading, and the adjusting spring by operation of the spring force rotates the second adjusting lever in the first direction when the brake assembly is released.

In an exemplary embodiment of the brake assembly, the brake assembly includes a brake back plate and the first and second pivot points are mounted to the brake back plate.

In an exemplary embodiment of the brake assembly, each adjusting lever has a first arm that is attached to the adjusting spring and a second arm that has a ratcheting end that operates to rotate the adjusting link.

In an exemplary embodiment of the brake assembly, the adjusting link has a plurality of teeth, and a ratcheting end of one of the adjusting levers catches a next one of the plurality of teeth during a release of the brake assembly to rotate the adjusting link.

In an exemplary embodiment of the brake assembly, the brake assembly further includes a connecting spring that connects at a first end to the first brake shoe and at a second end to the second brake shoe to spring mount the brake shoes, wherein when the adjusting link rotates, teeth of the adjusting link interact with a coil portion of the connecting spring to stretch the connecting spring to adjust the unloaded state position of the brake shoes.

In an exemplary embodiment of the brake assembly, each brake shoe has a brake pad that interacts against the friction member to apply the braking torque when the brake assembly is actuated respectively in the first direction of brake loading and the second direction of brake loading; when the brake assembly is actuated in the first direction of brake loading, the first brake shoe moves over a first stroke length, and the first stroke length increases with wear of the brake pad on the first brake shoe; when the brake assembly is actuated in the second direction of brake loading, the second brake shoe moves over a second stroke length, and the second stroke length increases with wear of the brake pad on the second brake shoe; and the stroke lengths increase based on wear of the brake pads until one of the adjusting levers rotates in an amount sufficient for the respective ratcheting end to overlap the next one of the plurality of teeth to rotate the adjusting link during a release of the braking assembly to adjust the unloaded state position of the brake shoe.

In an exemplary embodiment of the brake assembly, each brake shoe has a brake pad that interacts against the friction member to apply the braking torque when the brake assembly is actuated respectively in the first direction of brake loading and the second direction of brake loading; when the brake assembly is actuated in the first direction of brake loading, the first brake shoe moves over a first stroke length, and the first stroke length increases with wear of the brake pad on the first brake shoe; when the brake assembly is actuated in the second direction of brake loading, the second brake shoe moves over a second stroke length, and the second stroke length increases with wear of the brake pad on the second brake shoe; and the stroke lengths increase based on wear of the brake pads until one of the adjusting levers rotates in an amount sufficient to rotate the adjusting link during a release of the braking assembly to adjust the unloaded state position of the brake shoe.

In an exemplary embodiment of the brake assembly, the friction member is a cylindrical brake drum, and the brake shoes interact against an inner surface of the brake drum to apply the braking torque.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake assembly that transitions between an unloaded stated and a loaded state, wherein the brake assembly is actuated to transition from the unloaded state to the loaded state and is released to transition from the loaded state to the unloaded state, the brake assembly comprising:
   a friction member;
   a brake shoe that interacts against the friction member to apply a braking torque when the brake assembly is actuated; and
   an auto-adjustment mechanism that automatically adjusts an unloaded state position of the brake shoe relative to the friction member;
   the auto-adjustment mechanism comprising: an adjusting link that is rotatable to adjust the unloaded state position of the brake shoe, an adjusting lever that operates to rotate the adjusting link during a release of the braking assembly to adjust the unloaded state position of the brake shoe, an adjusting spring attached to the adjusting lever, and a pivot point about which the adjusting lever rotates in a first direction when the brake assembly is actuated and in a second direction opposite from the first direction when the brake assembly is released; and
   the brake shoe comprising an end pad positioned at an end of the brake shoe and that contacts and drives a first end of the adjusting lever when the brake assembly is actuated to rotate the adjusting lever in the first direction against the spring force of the adjusting spring, and the adjusting spring by operation of the spring force rotates the adjusting lever in the second direction when the brake assembly is released.

2. The brake assembly of claim 1, wherein:
   the brake assembly includes a brake back plate and the pivot point is mounted to the brake back plate;
   the adjusting spring is attached at a first end to the adjusting lever; and
   the adjusting spring is attached at a second end opposite to the first end to a pin fixed to the brake back plate.

3. The brake assembly of claim 1, wherein the adjusting lever has a first arm that is attached to the adjusting spring and a second arm that has a ratcheting end that operates to rotate the adjusting link.

4. The brake assembly of claim 3, wherein the adjusting link has a plurality of teeth, and the ratcheting end of the adjusting lever catches a next one of the plurality of teeth during a release of the brake assembly to rotate the adjusting link.

5. The brake assembly of claim 4, further comprising a connecting spring that spring mounts the brake shoe, wherein when the adjusting link rotates, teeth of the adjusting link interact with a coil portion of the connecting spring as the next one of the teeth rotates past the coil portion of the connecting spring to stretch the connecting spring to adjust the unloaded state position of the brake shoe.

6. The brake assembly of claim 5, wherein:
   the brake shoe has a brake pad that interacts against the friction member to apply the braking torque when the brake assembly is actuated;
   when the brake assembly is actuated, the brake shoe moves over a stroke length, and the stroke length increases with wear of the brake pad; and the stroke length increases based on wear of the brake pad until the adjusting lever rotates in an amount sufficient for the ratcheting end to overlap the next one of the plurality of teeth to rotate the adjusting link during a release of the braking assembly to adjust the unloaded state position of the brake shoe.

7. The brake assembly of claim 1, wherein:

the brake shoe has a brake pad that interacts against the friction member to apply the braking torque when the brake assembly is actuated;

when the brake assembly is actuated, the brake shoe moves over a stroke length, and the stroke length increases with wear of the brake pad; and the stroke length increases based on wear of the brake pad until the adjusting lever rotates in an amount sufficient to rotate the adjusting link during a release of the braking assembly to adjust the unloaded state position of the brake shoe.

8. The brake assembly of claim 1, wherein the friction member is a cylindrical brake drum, and the brake shoe interacts against an inner surface of the brake drum to apply the braking torque.

9. The brake assembly of claim 1, wherein the adjusting lever operates to rotate the adjusting link during a release of the braking assembly to adjust the unloaded state position of the brake shoe following actuation of the brake assembly in only one direction of brake loading.

\* \* \* \* \*